INVENTOR.
Arnold E. Biermann

United States Patent Office 2,902,013
Patented Sept. 1, 1959

2,902,013

INTERNAL COMBUSTION ENGINE CONTROL SYSTEMS

Arnold E. Biermann, Fairview Park, Ohio

Application May 20, 1957, Serial No. 660,202

15 Claims. (Cl. 123—48)

This invention relates to control systems for internal combustion engines as used for propelling vehicles. In particular, the invention refers to control systems for engines which are used for both propelling and braking or retarding the vehicle and in which it is possible to modulate the amount of engine braking.

This invention is particularly applicable for use with variable-stroke piston-type engines in which both engine power and engine braking are modulated by varying piston stroke. With this type of engine a control pedal is furnished having a power range, an engine idling range and an engine braking range.

The main objects of the invention are to provide a simple, reliable and low cost control system. This invention provides a simpler system than is described in my patent application filed February 20, 1956, Serial 566,-693—because it is unnecessary to sense engine speed and to provide a fuel shut-off valve.

With a variable-stroke engine it is practical to employ very large displacements which provide large amounts of engine braking when the piston stroke is extended to maximum stroke. The amount of braking available may be too great for sudden application as would result from removing the driver's foot from the pedal. Consequently, a further object of the invention is to improve the ease and safety of driving by providing an adjustable but fixed amount of engine braking after the control pedal is released.

These and other advantages of this invention will become apparent from the following description in which, Figure 1 is a schematic diagram of one form of the invention.

Figure 1:
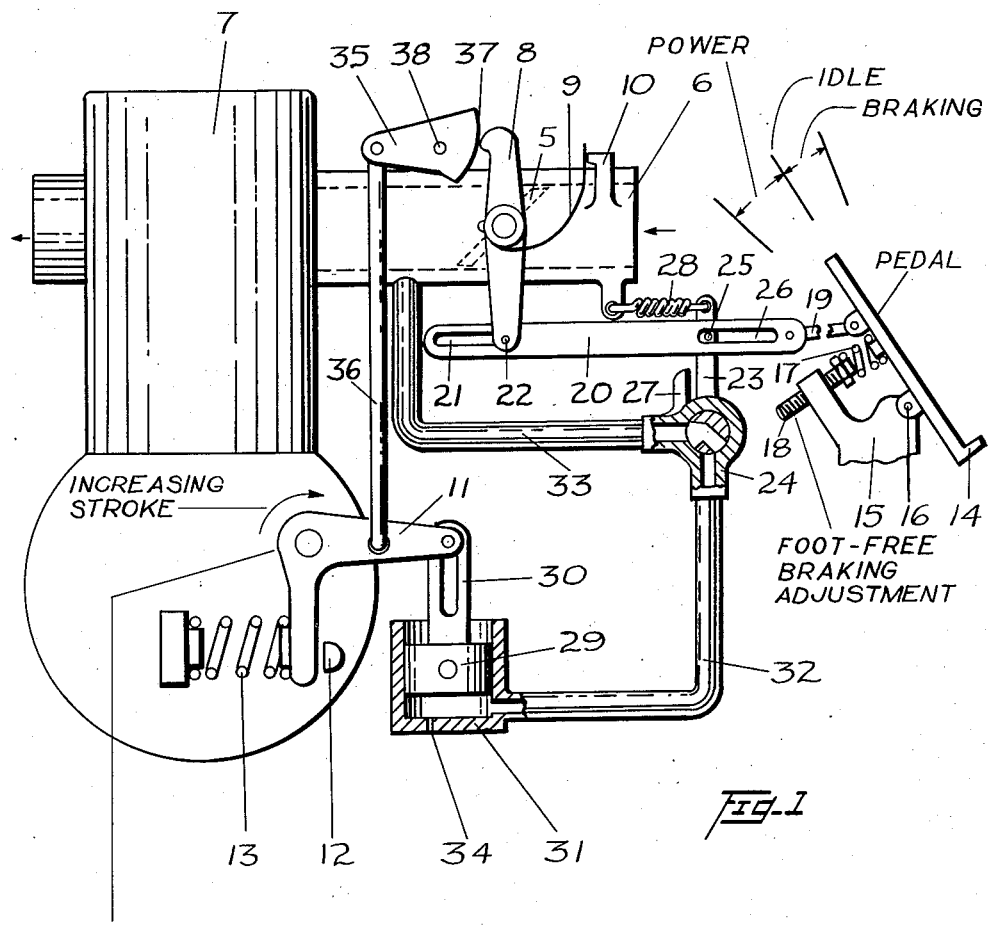
Figure 2:
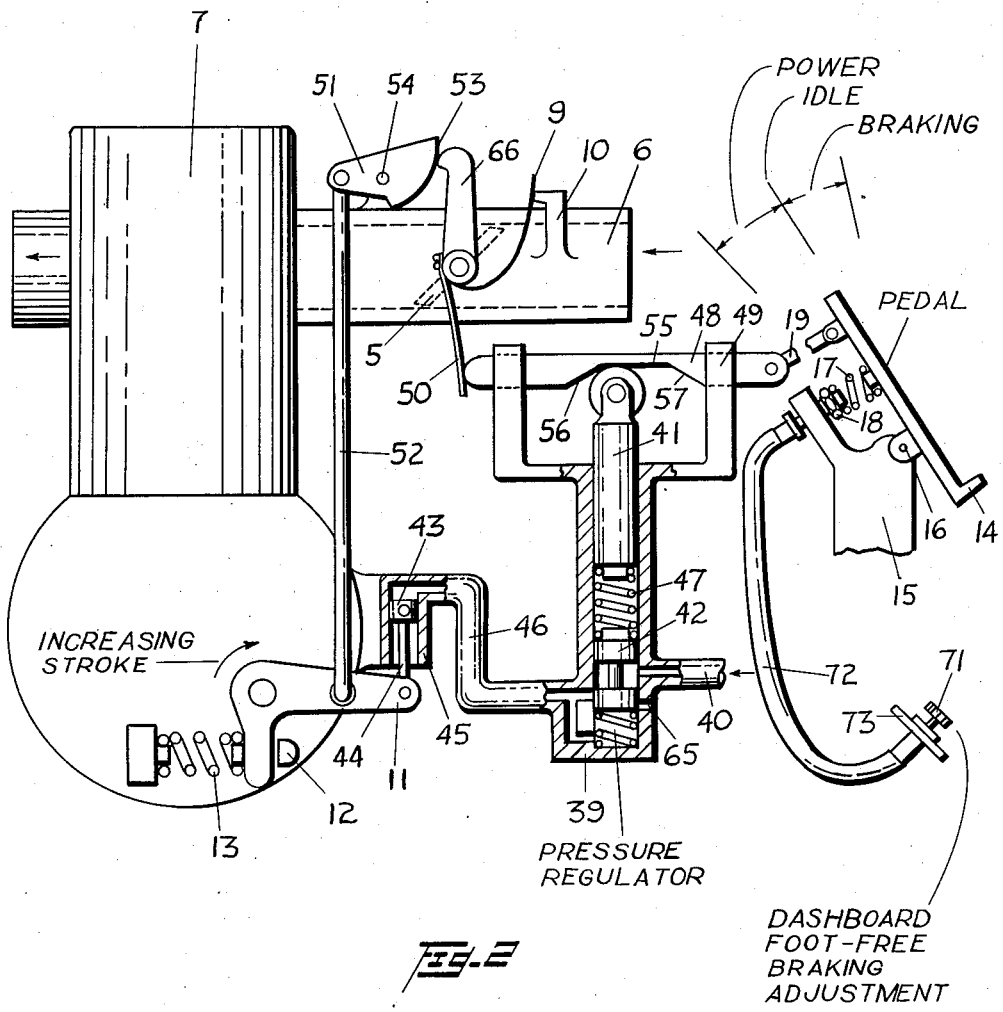
Figure 2 is a schematic diagram of a second form of the invention.
Figure 3:
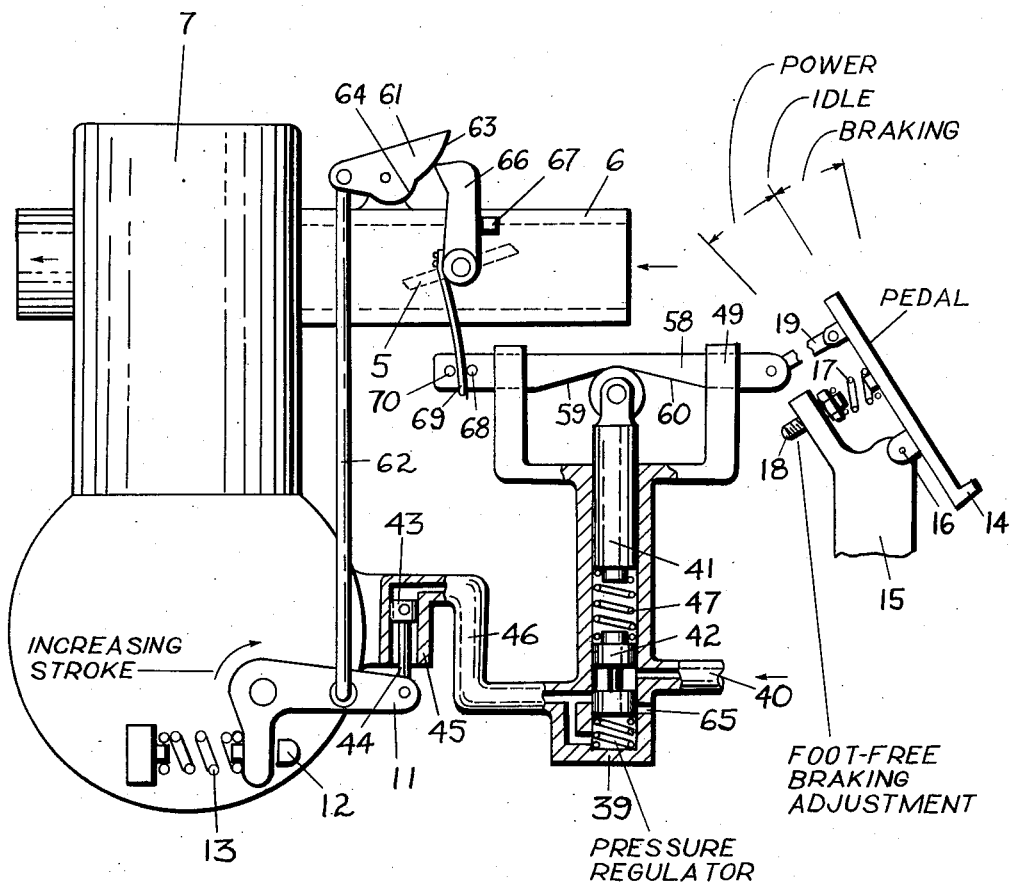
Figure 3 is a schematic diagram of a third form of the invention.

Referring now to Figures 1, 2 and 3, the intake control throttle 5 is mounted in the intake pipe 6 which supplies the internal combustion engine 7 with air or a fuel-air mixture. The length of the piston stroke of the engine is varied by angular movement of the stroke-change lever 11 which is forced toward the lever stop 12 by the stroke-change lever spring 13 when the engine is not in operation. A mechanism for varying the stroke of a variable stroke piston engine is fully disclosed in my co-pending application, Serial Number 519,314, now Patent No. 2,822,791. In Figures 1, 2 and 3, piston stroke is increased by movement of the stroke-change lever in a clockwise direction. Manual operation of the control system is provided by pedal 14 which is pivoted on frame 15 by pivot 16.

Pedal 14 is provided with a power range, an engine idling position and an engine braking range as indicated in the figures. Engine idling speed is defined here as the minimum speed that the engine will operate satisfactorily. Pedal spring 17 is mounted on the adjusting screw 18 and is arranged to force pedal 14 into the braking range any desired amount when the pedal is released. For convenience of description it is assumed that pedal 14 is operated by a foot of the driver. "Foot-free" engine braking is defined as the braking provided after the foot is removed from the control pedal.

Referring now to Figure 1, the intake throttle 5 is actuated through throttle lever 8 and is urged toward the closed position by spring 9 which bears against the stop 10. Throttle lever 8 is actuated from pedal 14 through pedal rod 19 and slotted link 20. Lever 8 engages slot 21 of link 20 through pin 22. Valve lever 23 of the manifold pressure valve 24 is actuated by pin 25 which engages slot 26 of link 20. Valve lever 23 is urged toward stop 27 by means of valve lever spring 28.

Engine 7 of Figure 1 is of that type of variable stroke engines in which engine torque tends to move the stroke-change lever 11 to an increased stroke setting. This movement of 11 is opposed by spring 13. Thus, for every value of engine torque there is a unique engine piston stroke. Because engine torque is a function of manifold pressure it follows that as the intake throttle 5 is opened, the resulting increase in engine mean effective pressure increases torque and this increase in torque serves to increase piston stroke. Therefore, each value of manifold pressure causes a unique value of piston stroke. The spring 13 forces the piston stroke to idling value when the throttle 5 is practically closed. In the braking range of operation the power for increasing the piston stroke, with throttle 5 closed, is provided by piston 29 and slotted connecting rod 30 operating in the servo cylinder 31. Servo cylinder 31 is connected with manifold pressure valve 24 through tube 32 and valve 24 is connected to the engine manifold 6 through tube 33. Cylinder 31 is provided with bleed 34. The idle setting of throttle 5 is modulated according to engine piston stroke by means of cam 35 which is actuated by the stroke-change lever 11 through rod 36. The cam surface 37 is shaped to open throttle 5 a proper amount to maintain idling speed at any setting of the stroke-change lever 11. Pivot 38 provides a fulcrum for cam 35.

It will be observed that the control system of Figure 1 provides means for automatically returning the engine to idling operation whenever the speed falls to idling value. For example, if the control pedal is in the braking range and the vehicle encounters an obstacle which reduces engine speed to idling value cam surface 37 will automatically provide a throttle opening such as to cause the engine to idle at that particular piston stroke setting. At engine speeds greater than idling an insufficient amount of fuel mixture will pass through the throttle to develop any appreciable power. The foregoing construction avoids a by-pass duct around the carburetor as provided in some inventions or the necessity for shutting off the fuel.

The embodiments of the invention shown in Figures 2 and 3 differ from the embodiment of Figure 1 in that power for varying piston stroke is supplied by hydraulic fluid pressure from an outside source for both the power and the braking ranges, whereas in Figure 1 piston stroke is varied in the power range by varying engine torque with the inlet throttle and is varied in the braking range by means of reduced manifold pressure acting on piston 29. In Figures 2 and 3 hydraulic fluid under pressure is supplied to the pressure regulator 39 through tube 40. The spool valve 42 of the pressure regulator 39 is actuated from the cam follower 41 through spring 47. Discharge from the pressure regulator is provided by port 65. Stroke-change lever 11 is actuated by piston 43 through rod 44. Piston 43 is mounted in servo cylinder 45 which is connected to the pressure regulator 39 by means of tube 46.

In Figure 2 the cam follower 41 is actuated from pedal 14 by means of cam link 48 which is mounted for reciprocation in frame 49 of the pressure regulator. The cam of link 48 consists of a flat portion 55 located between the sloping surfaces 56 and 57. Throttle lever 66 is actuated from cam link 48 by means of spring 50. The idle setting of throttle 5 is varied with respect to engine piston stroke by means of cam 51 which is actuated by the stroke-change lever 11 through rod 52. The cam surface 53 is of such shape as to open the throttle 5 a proper amount to maintain idling speed at any setting of the stroke of the engine piston. Pivot 54 provides a fulcrum for cam 51.

Figure 2 embodies a method of adjusting the amount of foot-free engine braking from the driver's compartment of a vehicle. In this figure the adjusting screw 18 is turned by means of flexible cable 72 and knob 71. Knob 71 may be mounted on the dash 73 in the driver's compartment.

The embodiment of the invention shown in Figure 3 differs from that shown in Figure 2 mainly in that at idling position the throttle 5 is open rather than practically closed. In Figure 3 idling is accomplished by reducing piston stroke to ultra-short values. In Figure 3 the cam follower 41 is actuated from pedal 14 by means of cam link 58 which is mounted for reciprocation in frame 49. The cam of link 58 consists of the two sloping surfaces 59 and 60 which rise to an apex as shown. Throttle 5 is actuated by throttle lever 66 which bears against stop 67 when in the open position. Throttle lever 66 is forced into the open position when pedal 14 is in the power range by means of pin 68 which bears against spring 69. When pedal 14 is in the braking range, pin 70 bears against spring 69 which forces throttle lever 66 against cam 61. Cam 61 has two cam surfaces 63 and 64. Cam surface 63 is of such shape as to close the throttle a proper amount to maintain idling operation as the control pedal 14 is moved from idling into the braking range. After the throttle is practically closed cam surface 64 provides the proper relationship between throttle opening and engine piston stroke to maintain idling operation at any piston stroke should engine speed fall to idling speed during braking operation.

The general requirements of the control systems described in this invention are as follows:

(1) The control system must provide operation with engine piston stroke as short as possible and with throttle as wide open as possible consistent with power requirements.

(2) Whenever the control pedal is in the braking range the control system must provide idling operation if engine speed falls to idling speed.

(3) The control system must provide a preselected amount of engine braking when the control pedal is released. (Identified as foot-free braking.)

(4) The control system must provide means for manual adjustment of the amount of foot-free braking at some convenient location in the vehicle.

Figure 4:
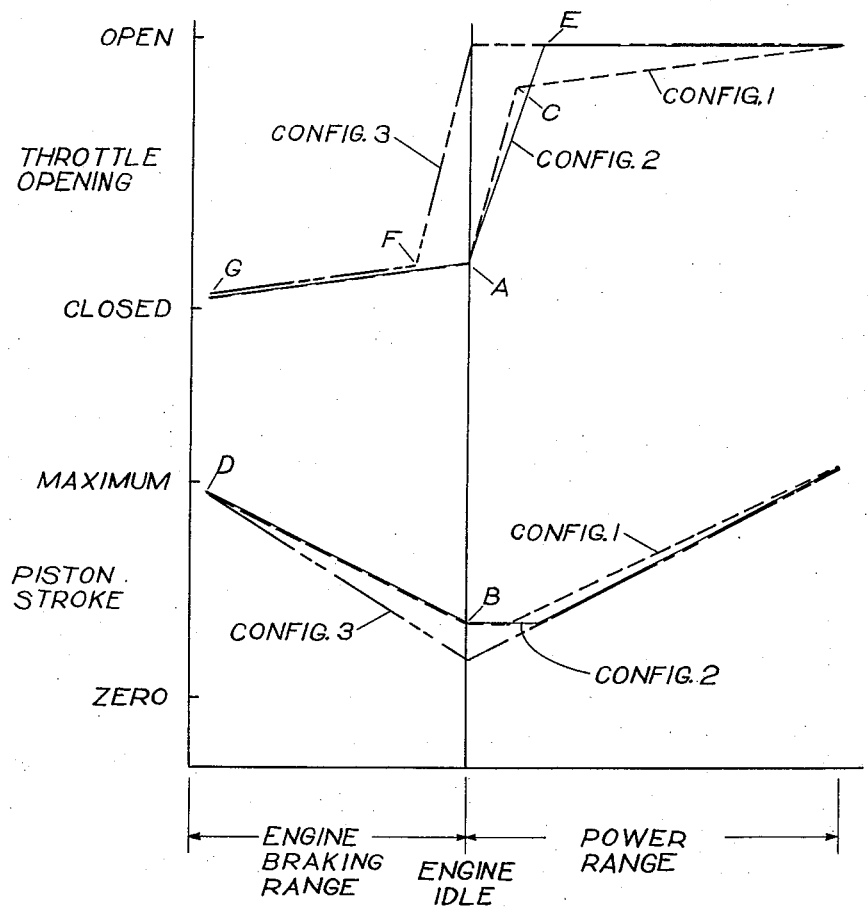
Figure 4 is a diagram showing a desired variation of several control variables for the forms of the invention shown in Figures 1, 2 and 3.

Figure 4 illustrates, in an approximate manner, the variation of throttle opening with engine piston stroke for the several forms of the invention. The operation of that form of the invention illustrated in Figure 1 is shown by configuration 1 of Figure 4. Normal engine idling, as shown at A of Figure 4, is accomplished with an almost closed throttle and somewhat greater than minimum piston stroke. As power is increased from idling, the piston stroke remains at idling value, as shown by B, until the throttle is opened to a pre-selected magnitude such as C. At this point further opening of the throttle is accompanied by a corresponding increase in stroke until full throttle and full stroke are reached. This increase in piston stroke is caused by the increase in engine torque, obtained by opening the throttle, which reacts on the stroke-change lever 11 to increase stroke until brought into equilibrium by the opposing torque force from spring 13. It will be observed that spring 13 is pre-loaded so that the stroke-change arm remains fixed until torque rises to a pre-selected value corresponding to the throttle opening at C. As the control pedal is moved from idling into the braking range pedal 14 opens valve 24 which serves to increase piston stroke by utilizing the reduced manifold pressure acting on piston 29. In this manner piston stroke increases from B to D (Figure 4).

During this braking operation throttle 5 is too far closed to provide enough mixture to develop any appreciable rise in the mean effective pressure of the engine, providing engine speed is greater than idling. If engine speed falls to idling value while pedal 14 is in the braking range it is necessary that the throttle opening be adjusted to provide idling cylinder pressures for any piston stroke used; otherwise either combustion ceases and the engine stops or the engine runs at faster than idling speed. This problem is solved by relating throttle opening to piston stroke through cam 35 and rod 36 as shown in Figure 1.

The operation of the configuration illustrated by Figure 2 is generally similar to that of Figure 1 with the exception that the piston stroke is actuated in both the power and braking ranges by means of hydraulic fluid under pressure from an outside source. The use of hydraulic actuating means in the configuration of Figure 2 permits opening the throttle to E of Figure 4 before piston stroke starts to increase. This method improves engine efficiency at part-throttle over that of Figure 1 because of the greater amount of operation possible at open throttle and short stroke. The mechanical efficiency of the engine is greatest with open throttle operation.

The operation of the configuration of Figure 2 is as follows: as pedal 14 is moved from idling position into the power range link 48 first opens throttle 5 and then cam surface 57 compresses spring 47 which opens the valve 42 which in turn supplies hydraulic pressure to cylinder 45 and causes an increase in piston stroke. It will be observed that spring 13 normally forces stroke-change lever 11 to minimum stroke. Therefore, for every hydraulic pressure supplied the servo-cylinder 45 there is a unique piston stroke. Likewise, for every pedal position there is a unique hydraulic pressure and consequently a unique piston stroke. As pedal 14 is moved from idle position into the braking range cam surface 56 increases the hydraulic pressure and thereby the piston stroke. At the same time spring 9 forces throttle lever 66 against cam surface 53. Cam 51 is actuated by stroke-change lever 11 and cam surface 53 is of such shape as to insure idling operation if engine speed falls to idling. In Figure 2 it will be observed that the shape of the cam of link 48 is the same as that of the diagram for piston stroke in Figure 4.

The operation of the embodiment of the invention illustrated by Figure 3 is generally similar to that of Figure 2 with the exception that the throttle is substantially open at idling position and the piston stroke is shorter as shown by Figure 4. This arrangement improves engine operating efficiency over that of Figure 2 because of the greater amount of operation possible at open throttle and short stroke.

The operation of the configuration of Figure 3 is as follows: as pedal 14 is moved from the idling position into the power range link 58 increases piston stroke with throttle open as shown in Figure 4. As pedal 14 is moved from idling into the braking range link 58 increases piston stroke simultaneously as the throttle is closed by cam 61 and spring 69. During this movement the throttle opening and the piston stroke are so related as to provide engine idling operation should engine speed fall to idling speed. As pedal 14 is moved into the braking range the throttle falls to minimum opening for idling as the stroke increases to maximum. Cam surface 63 provides idling throttle opening during the transition from open throttle to the low throttle opening of point F of Figure 4 and cam surface 64 provides the correct throttle opening for the range from F to G.

In all three configurations of this invention a preselected amount of foot-free engine braking is provided by spring 17 which forces pedal 14 into the braking range an amount determined by the screw 18. The provision of a selected amount of engine braking when the control pedal is released is an important feature of this invention as concerns the safety and ease with which a vehicle is driven. In present automobiles we have become accustomed to experience the retarding or braking effect of the engine when the control pedal is released. This braking effect assists in retarding the vehicle before the brakes are applied. In the past, free-wheeling was found to be unsafe because of the lack of this automatic braking. In emergencies, automatic foot-free braking has been found highly desirable. In variable stroke engines and in other arrangements in which it is possible to modulate the amount of engine braking and in which large amounts of engine braking are possible, the question arises as to how much foot-free braking to provide. If the foot-free engine braking is too great the occupants of the vehicle may be thrown from their seats during an emergency. On slippery roads it is advisable to reduce foot-free braking as compared to that provided for dry roads where the traction is good. Excessive braking on slippery roads can be more dangerous than no braking. One object of this invention is to provide means for adjusting the amount of foot-free braking from the driver's compartment of the vehicle. This objective is accomplished with a flexible cable and knob as shown in Figure 2. It will be observed that this method of controlling foot-free braking also applies to conventional automobile engines in which modulated braking is obtained by throttling the exhaust or by other means.

Each of the three embodiments of this invention described herein has special advantages. The configuration of Figure 1 applies where hydraulic supply pressure is unavailable or is too costly. This arrangement is the least costly, but provides the lowest engine efficiency of the three. The construction of Figure 3 provides the highest efficiency but requires an engine with ultra-short stroke. The design of Figure 2 is not as efficient as that of Figure 3, however the minimum stroke for this arrangement can be quite large.

This invention, as described in the foregoing, is an improvement over my previous patent application because the necessity for providing special means for cutting off fuel flow during braking and the necessity for an engine speed sensing device are avoided.

While I have described my invention in the foregoing in detail I wish it to be understood that many changes may be made therein without departing from the spirit of the same.

I claim:

1. In a control system for an internal combustion engine having an intake throttle and means for modulating engine braking, a control lever for controlling said intake throttle and said engine braking, said control lever having a braking range, means for automatically varying the opening of said throttle to cause said engine to operate at idling speed when engine speed falls to idling speed whenever said control lever lies in said braking range.

2. In a control system for a variable stroke internal combustion engine having an intake manifold throttle and a servo mechanism for varying piston stroke for providing modulated engine braking, a control lever for controlling said servo mechanism having a braking range, means for varying the opening of said throttle to cause said engine to operate at idling speed when engine speed falls to idling speed whenever said control lever lies in said braking range.

3. In combination, a variable stroke piston-type internal combustion engine and a control system, a stroke-change lever on said engine, an intake manifold throttle, a control lever having a power range, an engine idle position and an engine braking range, means for providing said throttle with a preselected variation of opening with respect to the movement of said stroke-change lever when said control lever lies in said braking range.

4. In a control system for a variable stroke internal combustion engine having an intake manifold throttle, a control lever having an engine idle position, a power range and a braking range, means for varying piston stroke in said power range and in said braking range, means for varying said throttle opening prior to variation of piston stroke as said control lever is moved from said idle position.

5. In a control system for a piston-type internal combustion engine having a variable piston stroke, an engine intake throttle, a control lever having a power range, an engine braking range and an idle position, means for progressively closing said throttle and lengthening said piston stroke as said control lever is moved from said idle position into said braking range.

6. In a control system for a variable stroke internal combustion engine having an intake manifold throttle and a servo mechanism for varying the stroke, a control lever having an engine idle position, a power range and an engine braking range, means for actuating said servo mechanism in said power range and in said braking range, control means for opening said throttle when said control lever is moved from said idle position into said power range and means for closing said throttle as said control lever is moved from said idle position into said braking range.

7. In a control system for a variable stroke internal combustion engine equipped with an intake throttle, a control lever having an engine idle position, a power range and an engine braking range, means for increasing piston stroke as said control lever is moved from said idle position into said power range and means for increasing piston stroke as said control lever is moved from said idle position into said braking range, means for opening said throttle as said control lever is moved from said idle position into said power range and means for substantially closing said throttle as said control lever is moved from said idle position into said braking range.

8. In a control system for an internal combustion engine having adjustably variable engine braking torque, a foot-operated control lever for actuating said control system, said control lever having a power range and an engine braking range, said control lever being pivoted so that pressure from the toe of the foot forces the control lever into said power range, said control lever being pivoted so that pressure from the heel of the foot forces the control lever into said engine braking range and means for adjustably varying the position of said control lever for the foot-free position.

9. In a control system for an internal combustion engine of the variable piston stroke type, a manifold throttle, a servo mechanism for varying the stroke of said engine, a control lever for controlling said throttle and said servo mechanism, said control lever having a power range, an engine braking range and an engine idle position, means for opening said throttle prior to increase of said stroke as said lever is moved from idle position into said power range.

10. In a control system for a variable stroke internal combustion engine, a manifold throttle, an adjustable stop for controlling the closing position of said manifold throttle, a control lever for actuating said manifold throttle, a stroke-change lever for varying piston stroke, means for actuating said stroke-change lever from said control lever and linkage means for positioning said adjustable stop as a function of the position of said stroke-change lever.

11. In a control system for a piston-type internal combustion engine having a mechanism for automatically increasing piston stroke as engine torque increases, an intake manifold throttle, a servo mechanism for varying the piston stroke of said engine, a control lever for controlling said throttle and said servo mechanism, said control lever having an engine idle position and a power range, means for opening said throttle a pre-selected amount prior to increase of piston stroke as said control lever is moved from said idle position into said power range.

12. In a control system for a piston-type internal combustion engine having a mechanism for automatically increasing piston stroke as engine torque increases beyond a pre-selected magnitude, an intake manifold with throttle, a control pedal having an engine idle postion, an engine braking range and an engine power range, means for opening said throttle a preselected amount prior to increase in piston stroke as said control lever is moved from said idle position into said power range and means actuated by reduction of pressure in said intake manifold for increasing piston stroke as said control lever is moved from said idle position into said braking range.

13. In a control system for a variable stroke piston-type internal combustion engine having a stroke-change mechanism with spring restraint for returning piston stroke to minimum value while the engine is idling, an engine intake manifold throttle, a control lever having a power range, an engine braking range and an engine idle position, hydraulic pressure means controlled by said control lever for increasing piston stroke as said lever is moved from said idle position into said power range and as said lever is moved into said braking range, and means for varying the opening of said throttle to cause the engine to idle when the speed of said engine falls to idling during engine braking.

14. In a control system for a variable stroke internal combustion engine having an intake manifold throttle, a control lever having a power range and a braking range, means for varying the opening of said inlet manifold throttle, means for varying said piston stroke in said power range and in said braking range, said piston stroke variation extending on either side of a region in which said throttle is varied over substantially the entire throttle opening range.

15. In a control system for a variable stroke internal combustion engine, a manifold throttle, an adjustable stop for controlling the closing position of said throttle, a control lever for actuating said manifold throttle, a stroke-change lever for varying piston stroke, a stroke-change valve actuated by said control lever, piston means for actuating said stroke-change lever, linkage means connecting said adjustable stop with said stroke-change lever for adjusting the closing position of said throttle as a function of piston stroke, said stroke-change valve serving to admit fluid under pressure to said piston means for varying the piston stroke of said internal combustion engine.

References Cited in the file of this patent

UNITED STATES PATENTS

| | | |
|---|---|---|
| 1,139,106 | Cutler | May 11, 1915 |
| 2,198,247 | Grob | Apr. 23, 1940 |
| 2,433,639 | Woodruff et al. | Dec. 30, 1947 |
| 2,670,724 | Reggio | Mar. 2, 1954 |